US011442158B2

(12) United States Patent
Koeppel et al.

(10) Patent No.: US 11,442,158 B2
(45) Date of Patent: Sep. 13, 2022

(54) MULTIPLE INPUT MULTIPLE OUTPUT IMAGING ARRAY AND CORRESPONDING IMAGING METHOD

(71) Applicant: Rohde & Schwarz GmbH & Co. KG, Munich (DE)

(72) Inventors: Tobias Koeppel, Munich (DE); Frank Gumbmann, Nuremberg (DE); Benedikt Simper, Munich (DE); Andreas Schiessl, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 221 days.

(21) Appl. No.: 16/529,367

(22) Filed: Aug. 1, 2019

(65) Prior Publication Data

US 2021/0033717 A1    Feb. 4, 2021

(51) Int. Cl.
*G01S 13/44* (2006.01)
*G01S 7/282* (2006.01)
*G01S 7/285* (2006.01)
*G01S 13/89* (2006.01)
*H01Q 3/02* (2006.01)
*G01S 13/00* (2006.01)

(52) U.S. Cl.
CPC .......... *G01S 13/4418* (2013.01); *G01S 7/282* (2013.01); *G01S 7/285* (2013.01); *G01S 13/89* (2013.01); *H01Q 3/02* (2013.01)

(58) Field of Classification Search
CPC .................................................... H01Q 1/421
See application file for complete search history.

(56) References Cited

U.S. PATENT DOCUMENTS

| 4,823,136 A | * | 4/1989 | Nathanson | .............. G01S 7/032 342/368 |
| 10,288,661 B2 | * | 5/2019 | Ahmed | ................. G01S 7/4004 |
| 2010/0324864 A1 | | 12/2010 | Vossiek et al. | |
| 2012/0274499 A1 | * | 11/2012 | Chang | ..................... G01S 13/89 342/107 |
| 2013/0063320 A1 | | 3/2013 | Kolak et al. | |

(Continued)

FOREIGN PATENT DOCUMENTS

| CA | 2469516 A1 | 1/2005 |
| CN | 106932774 A | 7/2017 |

(Continued)

OTHER PUBLICATIONS

EPO Search Report for the corresponding application EP 20 18 3024; document dated Nov. 25, 2020, but the date on Global Dossier is Dec. 3, 2020. (Year: 2020).*

(Continued)

*Primary Examiner* — Bernarr E Gregory
(74) *Attorney, Agent, or Firm* — Ditthavong, Steiner & Mlotkowski (57) ABSTRACT

A multiple input multiple output imaging array for incident angle resolved images with respect to a device under test is provided. The multiple input multiple output imaging array comprises a redundant array of transmit and receive antennas and a controller. In this context, the controller is configured to implement a selection scheme, wherein the selection scheme selects the respective transmit and receive antenna pairs used to create the corresponding image.

18 Claims, 11 Drawing Sheets

(56) References Cited

U.S. PATENT DOCUMENTS

| | | | | |
|---|---|---|---|---|
| 2014/0055297 A1* | 2/2014 | Beeri | .................... | G01S 13/003 342/21 |
| 2017/0363719 A1 | 12/2017 | Ahmed et al. | | |
| 2018/0227878 A1* | 8/2018 | Lashkarian | .......... | H01Q 3/2605 |
| 2019/0219685 A1* | 7/2019 | Shan | .................... | G01S 13/931 |
| 2019/0324136 A1* | 10/2019 | Amadjikpe | ........... | G01S 13/931 |

FOREIGN PATENT DOCUMENTS

| | | | | |
|---|---|---|---|---|
| EP | 3258288 A1 * | 12/2017 | ............. | H01Q 1/421 |
| JP | 56119872 A | 9/1981 | | |
| WO | 8504319 A1 | 10/1985 | | |
| WO | 9967900 A1 | 12/1999 | | |
| WO | 201220439 A1 | 2/2012 | | |
| WO | 201498660 A1 | 6/2014 | | |

OTHER PUBLICATIONS

EPO Search Opinion for the corresponding application EP 20 183 024.7; date of the opinion on Global Dossier is Dec. 3, 2020. (Year: 2020).*

R. Braun et al, "Aperture Arrays for the SKA: Dense of Sparse?"; published in SKA Memo 87; submitted on Nov. 6, 2006; posted on the Internet at arXiv:astro-ph/0611160v1. (Year: 2006).*

* cited by examiner

MULTIPLE INPUT MULTIPLE OUTPUT IMAGING ARRAY AND CORRESPONDING IMAGING METHOD

TECHNICAL FIELD

The invention relates to a multiple input multiple output imaging array for incident angle resolved images with respect to a device under test and a multiple input multiple output imaging method for incident angle resolved images with respect to a device under test.

BACKGROUND ART

Generally, especially in the context of autonomous vehicles, in times of an increasing number of automotive radar integration components, there is a growing need of a multiple input multiple output imaging array for incident angle resolved images and a multiple input multiple output imaging method for incident angle resolved images in order to verify correct functioning of said automotive radar integration components in a highly accurate and efficient manner. This is, for example, described in US 2017/0363719 A1.

Unfortunately, neither a multiple input multiple output imaging array for incident angle resolved images with respect to a device under test such as said automotive radar integration components nor a multiple input multiple output imaging method for incident angle resolved images with respect to a device under test is known.

Accordingly, there is a need to provide a multiple input multiple output imaging array for incident angle resolved images with respect to a device under test and a multiple input multiple output imaging method for incident angle resolved images with respect to a device under test, whereby both a high accuracy and a high efficiency are ensured.

SUMMARY OF THE INVENTION

According to a first aspect of the invention, a multiple input multiple output imaging array for incident angle resolved images with respect to a device under test is provided. The multiple input multiple output imaging array comprises a redundant array of transmit and receive antennas and a controller. In this context, the controller is configured to implement a selection scheme, wherein the selection scheme selects the respective transmit and receive antenna pairs used to create the corresponding image. Advantageously, not only a high accuracy but also a high efficiency can be ensured.

According to a first preferred implementation form of the first aspect of the invention, the selection scheme is based on the desired incident angle which will be used to create the corresponding image. Advantageously, for instance, efficiency can further be increased.

According to a second preferred implementation form of the first aspect of the invention, the transmit and receive antennas are disposed such that the transmit and receive antennas are approximately at the incident angle from one another from the respective specular point. Advantageously, for example, accuracy can further be increased.

According to a further preferred implementation form of the first aspect of the invention, a collection of the respective transmit and receive antenna pairs forms an array creating a distortion and/or alias minimized image.

Advantageously, for instance, both accuracy and efficiency can further be increased.

According to a further preferred implementation form of the first aspect of the invention, the controller is configured to reconstruct the corresponding image based on a densely sampled array. Advantageously, for example, reconstruction can be performed in a highly accurate and efficient manner.

According to a further preferred implementation form of the first aspect of the invention, on the basis of a collection of the respective transmit and receive antenna pairs forming an array creating a distortion and/or alias minimized image, the controller is configured to reconstruct the corresponding image based on the corresponding densely sampled array. Advantageously, for instance, accuracy and efficiency can further be increased.

According to a further preferred implementation form of the first aspect of the invention, the redundant array is redundant with respect to one dimension. Advantageously, for example, complexity can be reduced, thereby increasing efficiency.

According to a further preferred implementation form of the first aspect of the invention, the redundant array is redundant with respect to at least one dimension, preferably with respect to two dimensions. Advantageously, for instance, accuracy can further be increased.

According to a further preferred implementation form of the first aspect of the invention, the device under test and/or the redundant array is mechanically moved to create a synthetic two-dimensional redundant array over time.

Advantageously, for example, costs can be reduced, which leads to an increased efficiency.

According to a further preferred implementation form of the first aspect of the invention, the device under test comprises a radome, preferably an automotive radome. Advantageously, for instance, automotive radar integration components can be tested.

According to a further preferred implementation form of the first aspect of the invention, the redundant array comprises at least one sparsity. Advantageously, for example, accuracy can be increased.

According to a further preferred implementation form of the first aspect of the invention, the controller is configured to create exact incident angles through interpolations between nearby incident angles. Advantageously, for instance, accuracy can further be increased.

According to a further preferred implementation form of the first aspect of the invention, the controller is configured to resolve the at least one sparsity. Advantageously, for example, both efficiency and accuracy can be increased.

According to a further preferred implementation form of the first aspect of the invention, the controller is configured to average between nearby incident angles. Advantageously, for instance, accuracy can further be increased.

According to a further preferred implementation form of the first aspect of the invention, the controller is configured to resolve the at least one sparsity by averaging between nearby incident angles. Advantageously, for example, not only accuracy but also efficiency can further be increased.

According to a second aspect of the invention, a multiple input multiple output imaging method for incident angle resolved images with respect to a device under test is provided. The multiple input multiple output imaging method comprises the steps of providing a redundant array of transmit and receive antennas, and implementing a selection scheme, wherein the selection scheme selects the respective transmit and receive antenna pairs used to create the corresponding image. Advantageously, not only a high accuracy but also a high efficiency can be ensured.

According to a first preferred implementation form of the second aspect of the invention, the selection scheme is based on the desired incident angle which will be used to create the corresponding image. Advantageously, for instance, efficiency can further be increased.

According to a second preferred implementation form of the second aspect of the invention, the method further comprises the step of disposing the transmit and receive antennas such that the transmit and receive antennas are approximately at the incident angle from one another from the respective specular point. Advantageously, for example, accuracy can further be increased.

According to a further preferred implementation form of the second aspect of the invention, the method further comprises the step of forming an array creating a distortion and/or alias minimized image with the aid of a collection of the respective transmit and receive antenna pairs.

Advantageously, for instance, both accuracy and efficiency can further be increased.

According to a further preferred implementation form of the second aspect of the invention, the method further comprises the step of reconstructing the corresponding image based on a densely sampled array. Advantageously, for example, reconstruction can be performed in a highly accurate and efficient manner.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
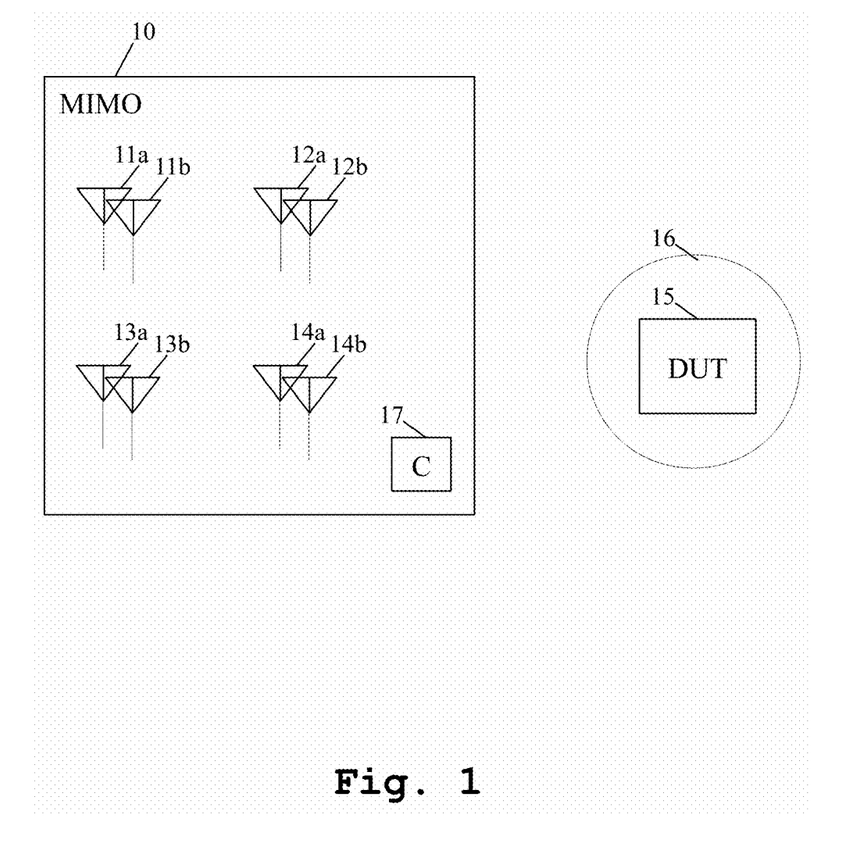
FIG. 1 shows an exemplary embodiment of the first aspect of the invention.

Firstly, FIG. 1 illustrates an exemplary embodiment of the inventive multiple input multiple output imaging array 10 for incident angle resolved images with respect to a device under test 15. The multiple input multiple output imaging array 10 comprises a redundant array of transmit and receive antennas, exemplarily four pairs of transmit antennas 11*a*, 12*a*, 13*a*, 14*a* and corresponding receive antennas 11*b*, 12*b*, 13*b*, 14, and a controller 17.

In this context, the controller 17 implements a selection scheme, wherein the selection scheme selects the respective transmit and receive antenna pairs used to create the corresponding image. It is noted that it might be particularly advantageous if the selection scheme is based on the desired incident angle which will be used to create the corresponding image.

Furthermore, the transmit antennas 11*a*, 12*a*, 13*a*, 14*a* and the receive antennas 11*b*, 12*b*, 13*b*, 14*b* may be disposed such that the transmit antennas 11*a*, 12*a*, 13*a*, 14*a* and the receive antennas 11*b*, 12*b*, 13*b*, 14*b* are approximately at the incident angle from one another from the respective specular point.

In addition to this or as an alternative, a collection of the respective transmit and receive antenna pairs may form an array creating a distortion and/or alias minimized image. Moreover, it might be particularly advantageous if the controller reconstructs the corresponding image based on a densely sampled array.

Additionally or alternatively, on the basis of a collection of the respective transmit and receive antenna pairs forming an array creating a distortion and/or alias minimized image, the controller may reconstruct the corresponding image based on the corresponding densely sampled array. It is further noted that it might be particularly advantageous if the redundant array is redundant with respect to one dimension.

Alternatively, the redundant array may especially be redundant with respect to at least one dimension, preferably with respect to two dimensions. Furthermore, especially in the case that the redundant array is redundant with respect to one dimension, the device under test 15 and/or the redundant array may be mechanically moved to create a synthetic two-dimensional redundant array over time.

With respect to the device under test 15, in accordance with FIG. 1, it is noted that the device under test 15 comprises a radome 16, preferably an automotive radome. In this context, it is further noted that a radome especially is a radar dome.

With respect to the redundant array, it is noted that the redundant array may especially comprise at least one sparsity. Moreover, the controller 17 may especially create exact incident angles through interpolations between nearby incident angles. With special respect to the above-mentioned at least one sparsity, it is noted that the controller 17 may resolve the at least one sparsity.

It is further noted that it might be particularly advantageous if the controller 17 may average between nearby incident angles. Furthermore, the controller 17 may especially resolve the at least one sparsity by averaging between nearby incident angles.

Figure 2:
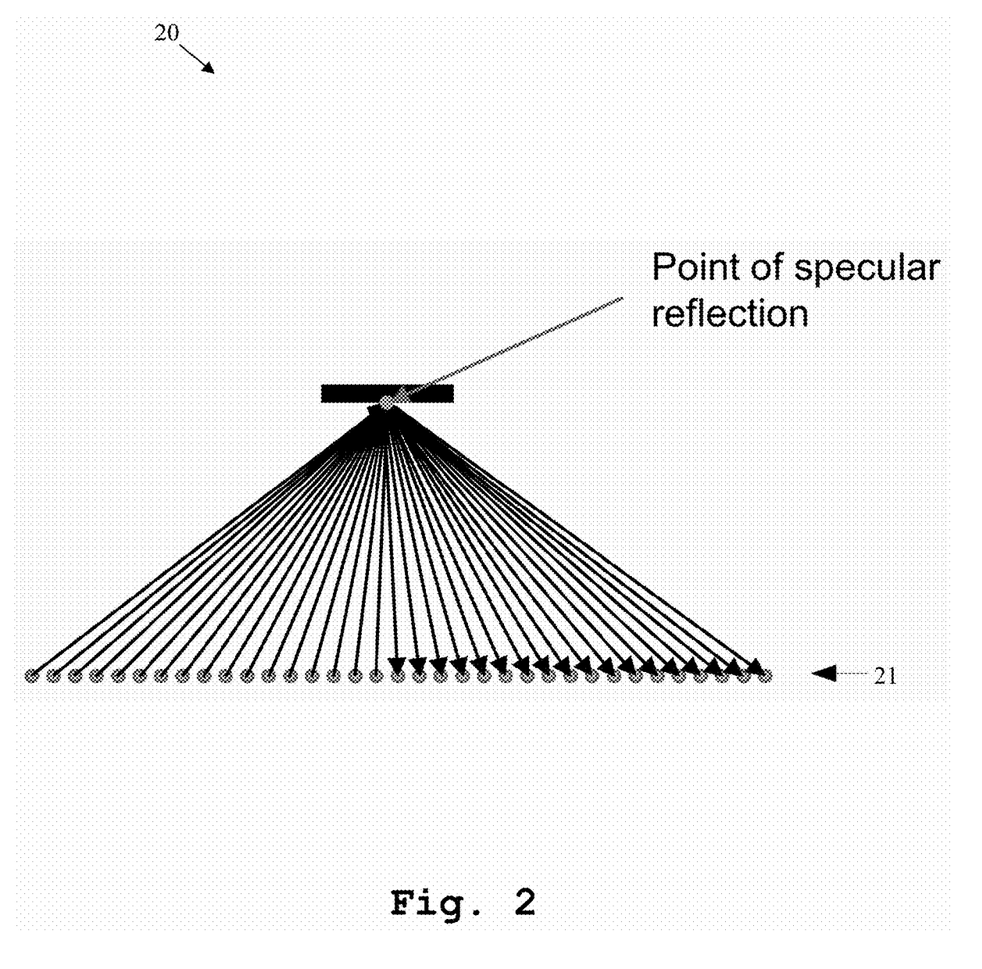
FIG. 2 shows a first exemplary situation with respect to a point of specular reflection.

Now, with respect to FIG. 2, a first exemplary situation 20 with respect to a point of specular reflection is depicted.

In accordance with FIG. 2, one exemplary point of specular reflection is shown. In addition to this, multiple transmit and receive antenna pairs 21 are illustrated. In this context, a single transmit and receive antenna pair especially comprises an independent transmitter and receiver in the same position. Furthermore, the multiple transmit and receive antenna pairs 21 especially form an array, preferably a one-dimensional array.

As it can further be seen, a very large number of transmitter and receiver pairs especially exists for a point of specular reflection, each with their own angle of incidence or reflection, respectively. In other words, it is provided a multiple input multiple output (MIMO) array with high redundancy. Depending on the size of the MIMO array, the exact antenna distribution in this array, the position of the point of specular reflection, and the number of transmitter and receiver pairs may vary.

In order to capture the incident angle dependent reflection of a point of reflection over a wide range of angles without too big gaps, the antenna distributions of the corresponding receiver array and the corresponding transmitter array may especially not contain big gaps. However, at the same time, it is not necessary to have a perfectly dense populated receiver and transmitter array. Small gaps can advantageously be tolerated in return for an averaging over a small range of incident angles to close gaps.

Exemplarily, for the point of specular reflection according to FIG. 2, a large amount of transmitter and receiver pairs exists. Since the point of specular reflection is centered in front of the symmetrical MIMO array, the amount of transmitter and receiver pairs especially is at a maximum. Each neighboring point of specular reflection still has a large amount of transmitter receiver pairs, even though not as many due to the finite length of the array.

It is noted that because of symmetry for each transmitter receiver pair according to FIG. 2, the same single path exits in the other direction. Said signal path has been omitted for the sake of keeping the figures clean. This also applies for the following figures.

Figure 3:
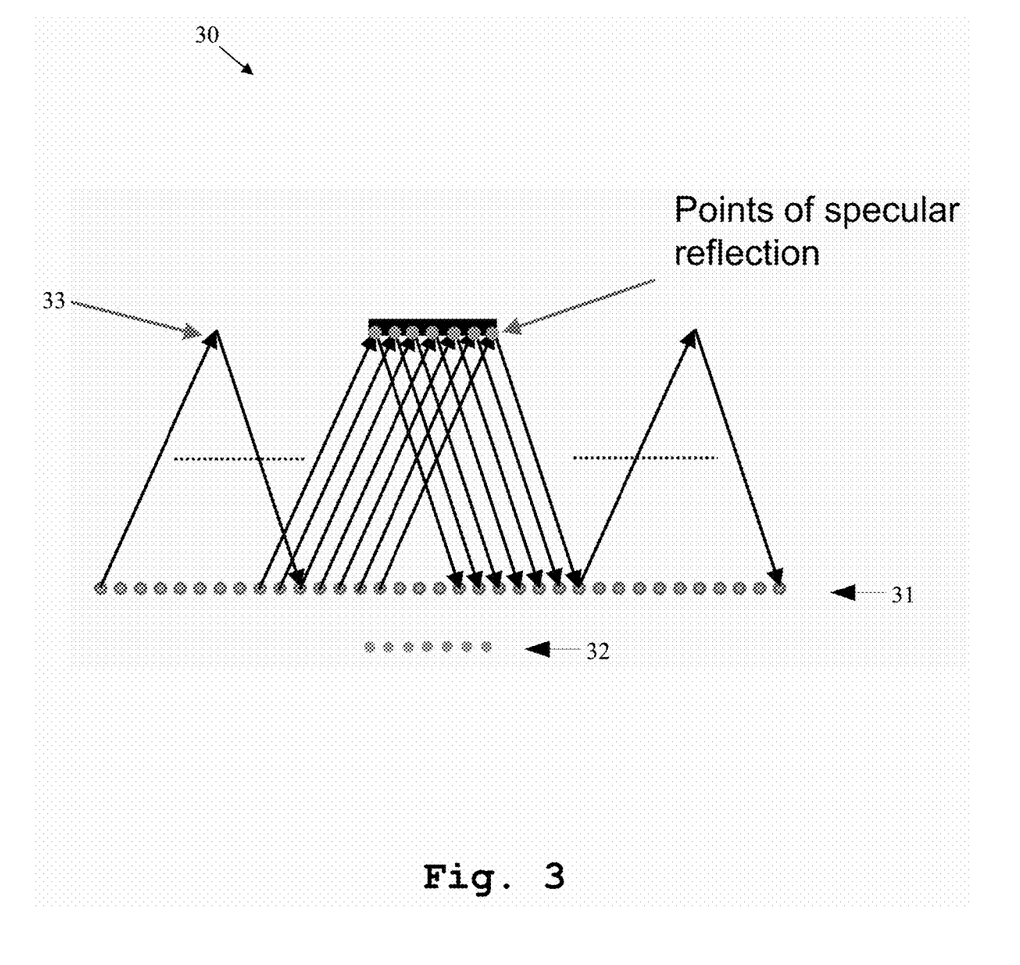
FIG. 3 shows a second exemplary situation with respect to points of specular reflection.

Furthermore, FIG. 3 illustrates a second exemplary situation 30 with respect to points of specular reflection. In this context, multiple transmitter and receiver pairs 31 especially in the form of a one-dimensional array are shown.

Additionally, a virtual array 32 is depicted. The virtual array 32 especially only comprises the respective contributing parts for the specularly reflecting components of the respective device under test. The virtual array 32 preferably is a one-dimensional virtual array.

Moreover, reference sign 33 marks the case, wherein the respective transmitter and receiver pair has no valid signal path because there is no specular reflection point for it in this example. Additionally, it is still accounted for in every measurement but does not contribute to the result in the depicted case. Furthermore, it still contributes for scattering reflectors in the scene, that is the edges of the respective device under test. This especially applies for the respective following figures as well.

It is further noted that with the depicted transmitter and receiver pairs 21 according to FIG. 2, no image, especially no millimeter wave image, can be created since all of them have the same virtual antenna. In order to be able to create an image, preferably a millimeter wave image, especially a virtual array has to be formed.

For each point of specular reflection in front of the array, the correct transmitter and receiver pair especially has to be picked to create a virtual array that preferably consist only of transmitter and receiver pairs that have the desired incident angle with respect to the points of specular reflection.

Furthermore, the incident angles do not necessarily have to be the same for each transmitter and receiver pair especially making up the virtual array. For instance, for potential device under tests, it could be relevant to have higher incident angles on the sides and lower ones in the center. In general, the angles of incidence and reflection are especially given by the angle between the respective surface normal at the point of specular reflection and the vector of incidence and reflection, respectively.

Moreover, the transmitter and receiver pairs may preferably picked with respect to the following constraints. Firstly, for each point of specular reflection in front of the respective physical aperture, the transmitter and receiver pairs with the desired incident angles have to be selected. Secondly, the respective resulting virtual array has to be densely sampled such that an image reconstruction is possible.

It is further noted that an arbitrary amount of virtual arrays may be built and for each one an image, preferably a millimeter wave image, can be reconstructed.

Figure 4:
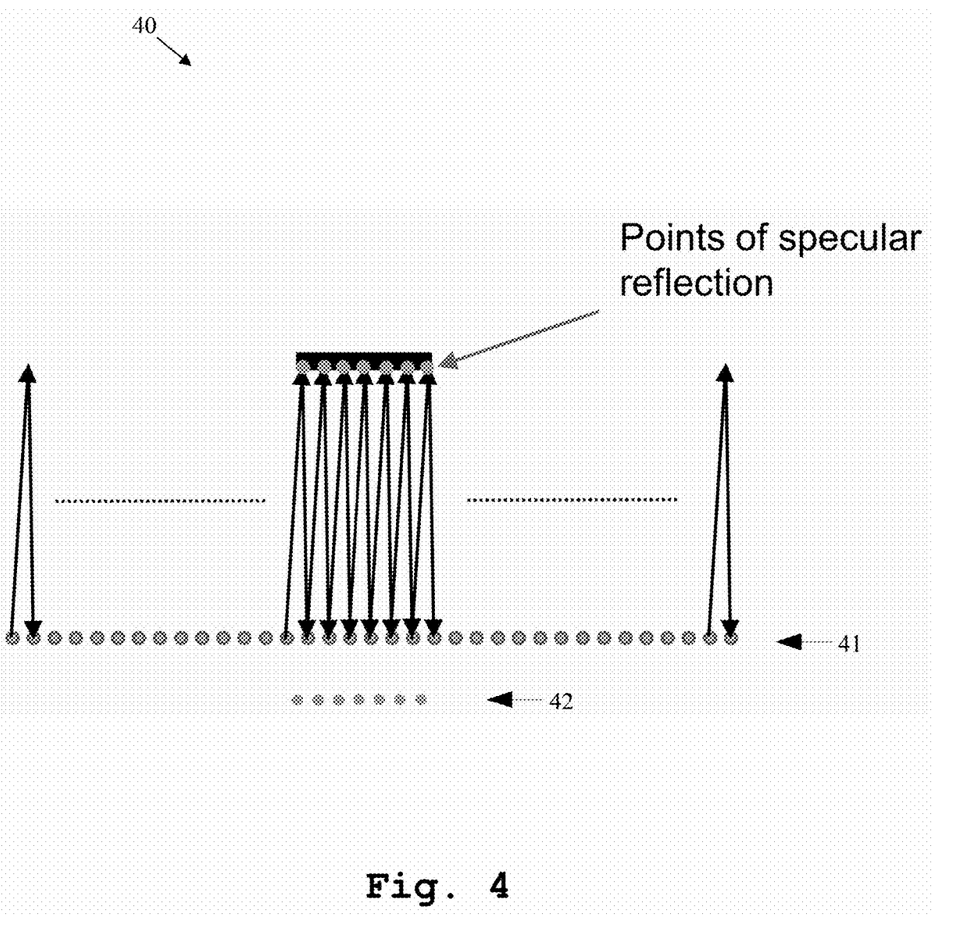
FIG. 4 shows a third exemplary situation with respect to points of specular reflection.

According to FIG. 4, a further exemplary situation 40 with respect to points of specular reflection is depicted. In this context, a physical array 41, preferably a one-dimensional physical array, and a virtual array 42, preferably a one-dimensional virtual array, are shown. Exemplarily, as it can be seen, transmitter and receiver pairs with very low incident angles are selected. Additionally, for each point of reflection, there is an identical incident angle.

It is further noted that the respective virtual aperture is still densely populated and especially of the same size as in FIG. 3.

Figure 5:
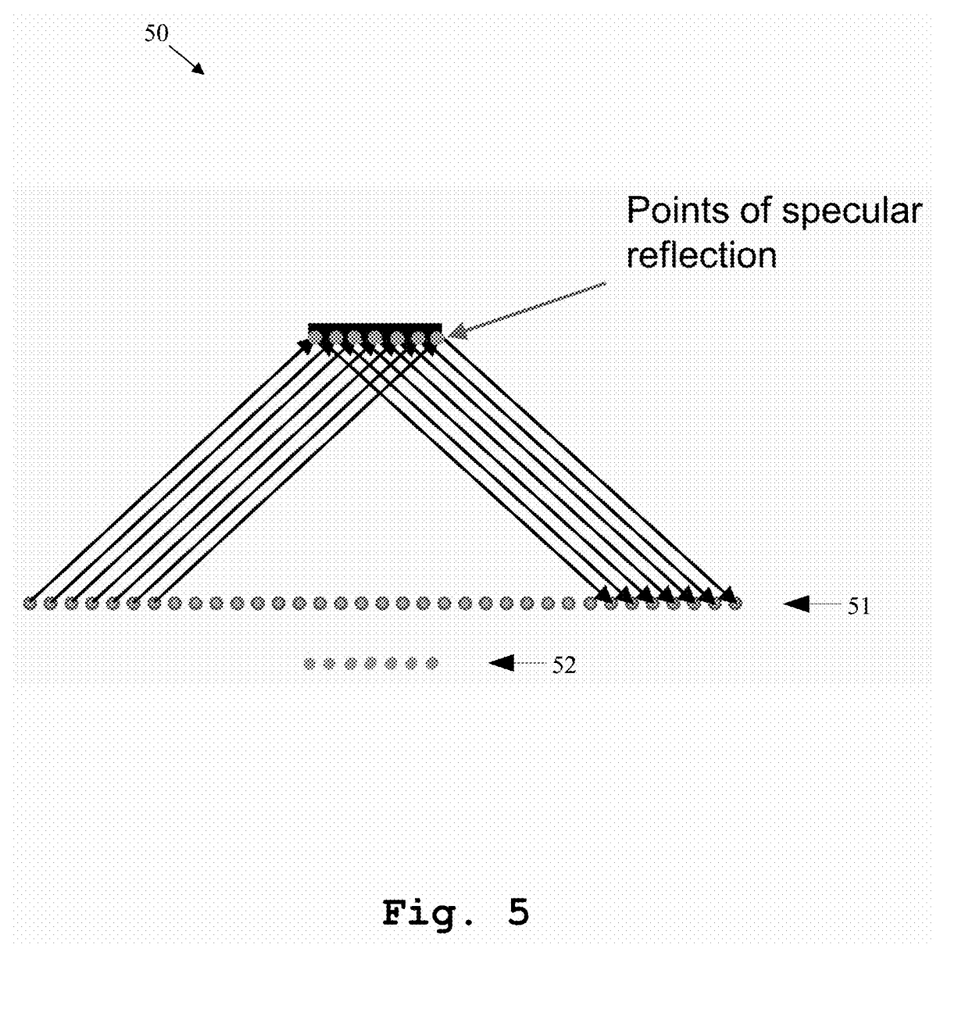
FIG. 5 shows a fourth exemplary situation with respect to points of specular reflection.

Furthermore, FIG. 5 shows a further exemplary situation 50 with respect to points of specular reflection. In this context, a physical array 51, preferably a one-dimensional physical array, and a virtual array 52, preferably a one-dimensional virtual array, are depicted.

Exemplarily, as it can be seen, transmitter and receiver pairs with very high incident angles are selected. Additionally, for each point of reflection, there is an identical incident angle. It is further noted that the respective virtual aperture is still densely populated and especially of the same size as in FIG. 3 and FIG. 4.

Figure 6:
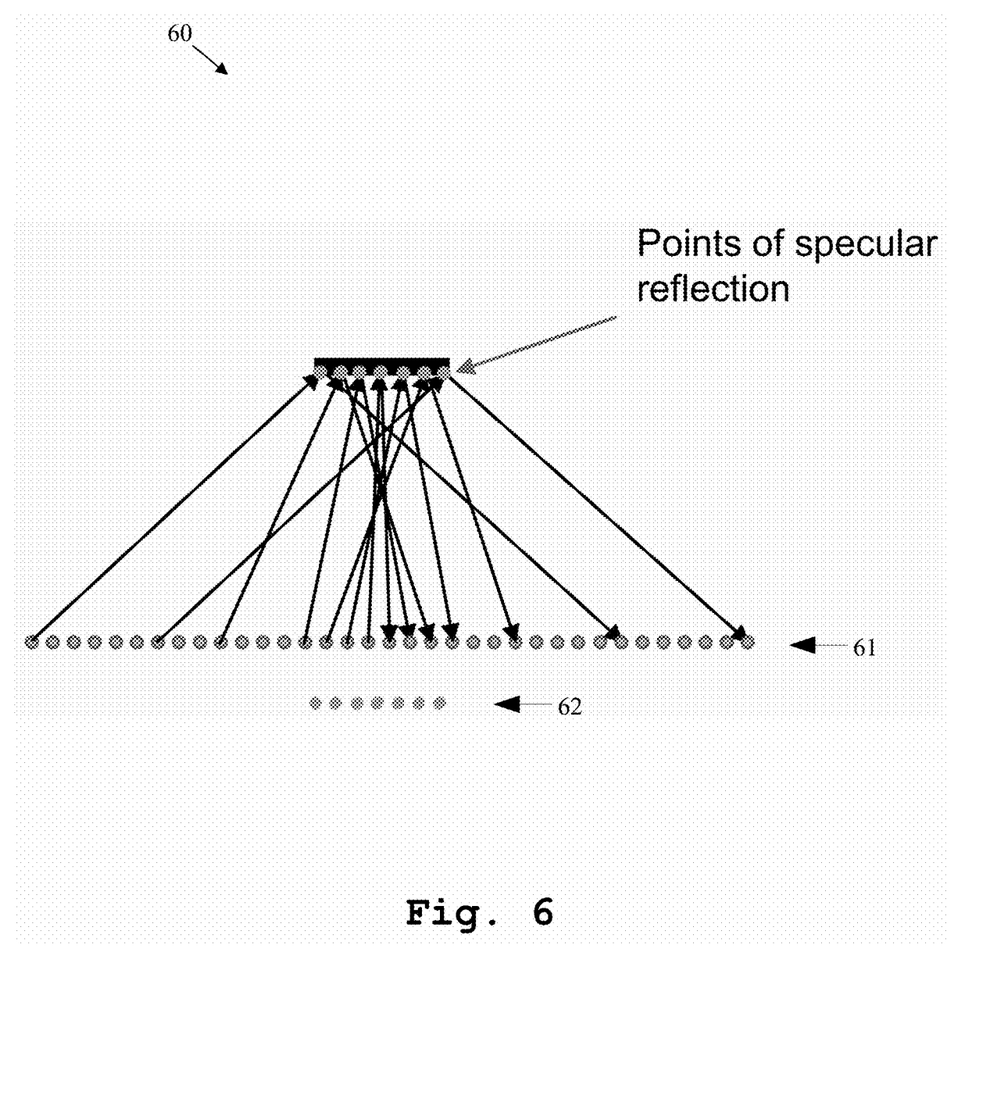
FIG. 6 shows a fifth exemplary situation with respect to points of specular reflection.

Moreover, FIG. 6 illustrates a further exemplary situation 60 with respect to points of specular reflection. In this context, a physical array 61, preferably a one-dimensional physical array, and a virtual array 62, preferably a one-dimensional virtual array, are depicted. Exemplarily, as it can be seen, transmitter and receiver pairs with mixed incident angles are selected. In addition to this, high incident angles are on the sides, whereas the lower ones are as closer to the center. It is further noted that the respective virtual aperture is still densely populated and especially of the same size as in FIG. 3, FIG. 4, and FIG. 5.

Generally, with special respect to the respective device under test, preferably regarding the shape thereof, it is noted that the targeted devices under test of the invention are especially automotive radar covers such as emblems, logos, bumpers, plastic covers, or the like. The vast majority of these parts especially have no or little curvature. Furthermore, these parts especially have a smooth surface.

It is further noted that for the vast majority of the devices under test, the invention can be applied without accounting for the shape. Moreover, a significant curvature of devices under test can be accounted for especially by choosing the respective transmitter and receiver pairs according to the shape of the respective device under test.

Figure 7:
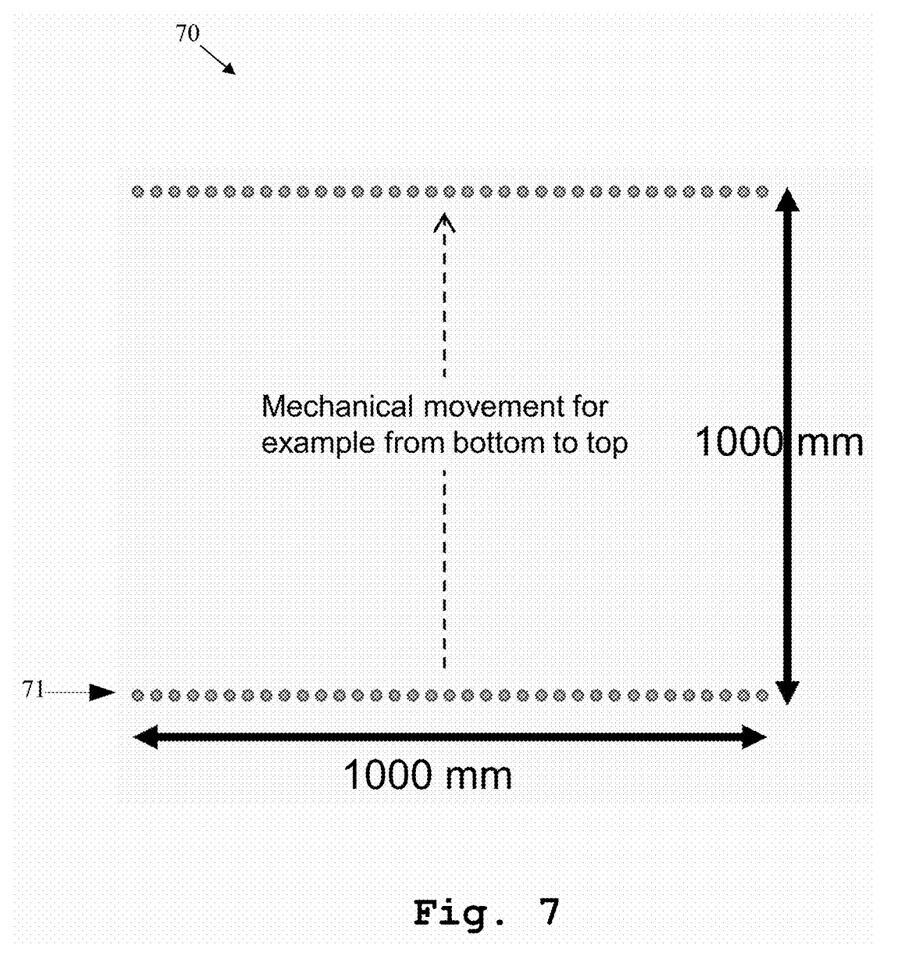
FIG. 7 shows a further exemplary embodiment of the first aspect of the invention.

Now, with respect to FIG. 7, another embodiment of the first aspect of the invention is depicted. In this context, a physical array 71, preferably a one-dimensional physical array, comprising multiple transmitter and receiver pairs is mechanically moved from bottom to top.

It is generally noted that it might be particularly advantageous if the physical array is highly redundant in at least one dimension. Furthermore, the physical array can be realized as a fully electronic array, a technically scanning array which emulates said physical array through a series of separate measurement or a combination of both.

It is further noted that with the aid of the mechanical movement, the physical array 71 can be extended especially via a synthetic aperture approach in at least one dimension. For instance, a one-dimensional highly redundant physical array may be moved along an arbitrary trajectory to extend the array in the dimensions given by the trajectory.

Moreover, the respective device under test may be mechanically moved to extend the physical array especially via inverse synthetic aperture approach in at least one dimension. For example, a device under test may be moved along an arbitrary trajectory to extend the array into the dimensions given by the trajectory.

Furthermore, the following points should be mentioned. Firstly, since the MIMO array may be highly redundant in one direction, a fully electronic realization in two dimension may not be viable. Secondly, a two-dimensional array may be synthesized through movement of either the MIMO array or the device under test in at least one other direction. Thirdly, highly redundant MIMO arrays in two dimensions with sufficient size may not be viable especially from both a technical and an economical point of view. Fourthly, in what direction the redundant MIMO array or device under test is moved and in what direction it is highly redundant can be freely chosen depending on the application, mechanical constraint etc. This does especially not affect the nature of the invention.

Figure 8:
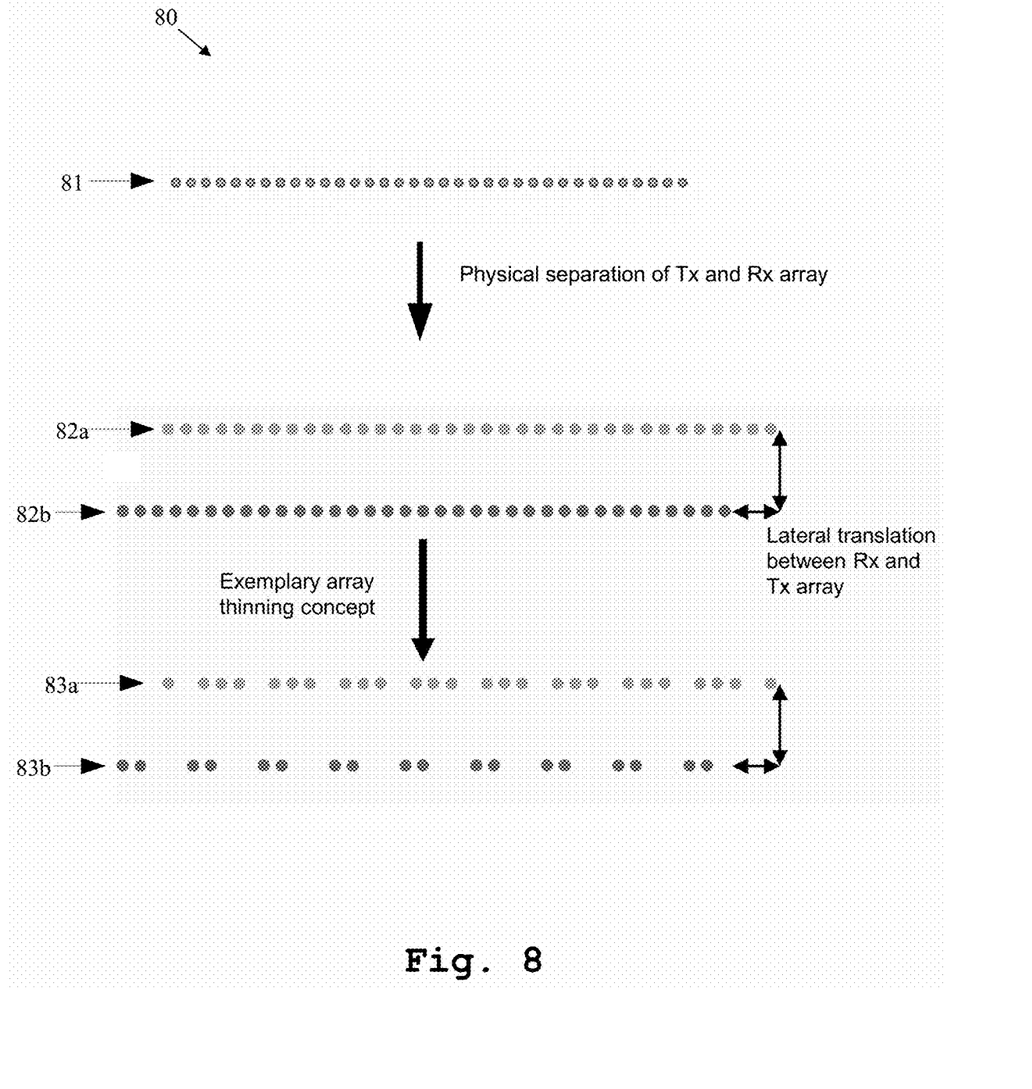
FIG. 8 shows an exemplary array thinning concept.

In accordance with FIG. 8, an exemplary array thinning concept is shown. In this exemplary case, with respect to an array 81 comprising multiple transmitter and receiver pairs, a physical separation of the respective transmitter array 82b and the respective receiver array 82a is performed. In this context, as it can further be seen from FIG. 8, said separation leads to lateral translation between the receiver array 82a and the transmitter array 82b.

According to the exemplary thinning concept, it is provided a receiver array 83a comprising some gaps and a transmitter array 83b comprising some gaps. It is noted that it might be particularly advantageous if the gap between antennas is kept small, preferably smaller than three time the respective wavelength of radiation. Especially in order to create densely sampled virtual arrays, the gaps should be closed by introducing averaging over incident angles.

It is further noted that the positions of the respective transmitter and receiver arrays of physically separated arrays can be freely chosen especially as longs as they stay highly redundant in at least one dimension and virtual arrays with distinct incident angle properties can be built.

Figure 9:
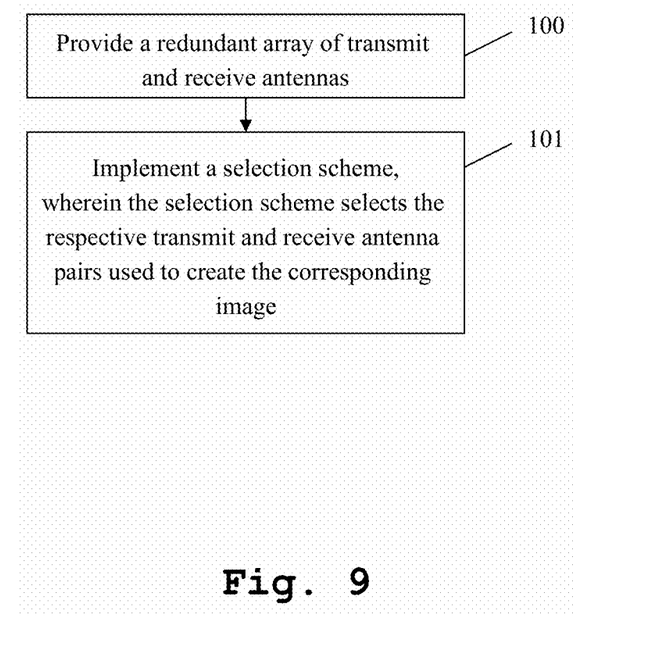
FIG. 9 shows a flow chart of an exemplary embodiment of the second aspect of the invention.

Finally, FIG. 9 shows a flow chart of an exemplary embodiment of the inventive multiple input multiple output imaging method for incident angle resolved images with respect to a device under test. In a first step 100, a redundant array of transmit and receive antennas is provided. Then, in a second step 101, a selection scheme is implemented, wherein the selection scheme selects the respective transmit and receive antenna pairs used to create the corresponding image.

It might be particularly advantageous if the selection scheme is based on the desired incident angle which will be used to create the corresponding image.

Figure 10:
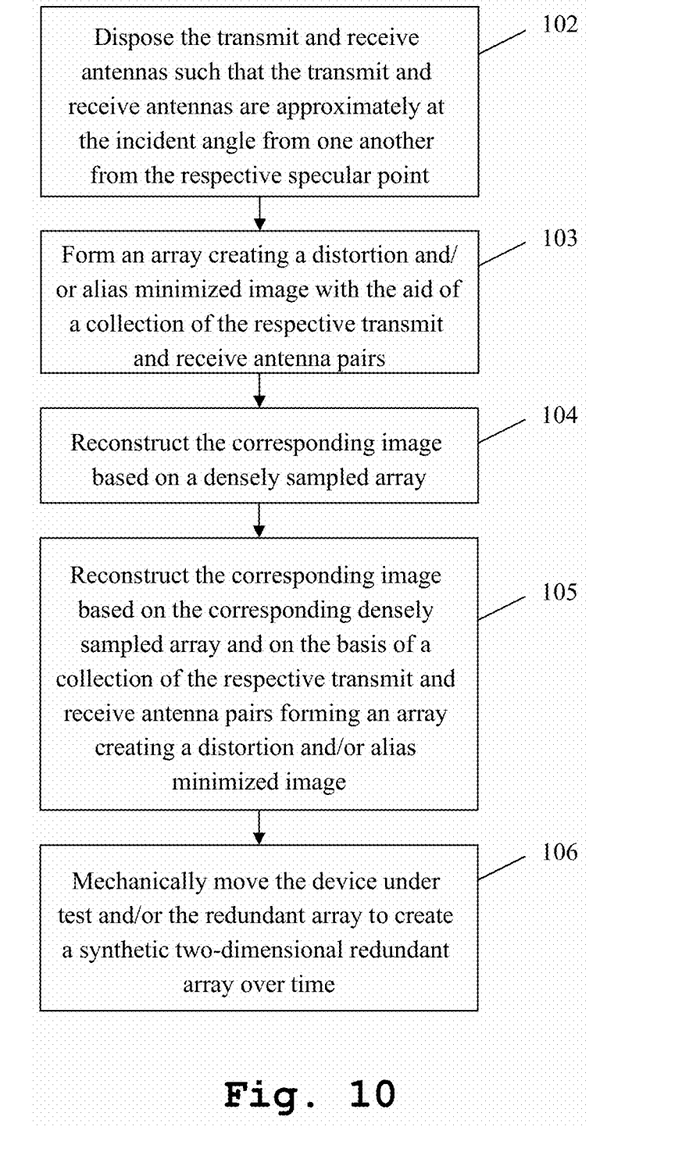
FIG. 10 shows a flow chart of a further exemplary embodiment of the second aspect of the invention.

In addition to this or as an alternative, in accordance with FIG. 10, the method may further comprise the step of disposing the transmit and receive antennas such that the transmit and receive antennas are approximately at the incident angle from one another from the respective specular point.

Additionally or alternatively, the method may further comprise the step of forming an array creating a distortion and/or alias minimized image with the aid of a collection of the respective transmit and receive antenna pairs. Further additionally or further alternatively, the method may espe-cially comprise the step of reconstructing the corresponding image based on a densely sampled array.

Furthermore, on the basis of a collection of the respective transmit and receive antenna pairs forming an array creating a distortion and/or alias minimized image, the method may additionally or alternatively comprise the step of reconstructing the corresponding image based on the corresponding densely sampled array.

With respect to the above-mentioned redundant array, it is noted that the redundant array may especially be redundant with respect to one dimension. Furthermore, the redundant array may be redundant with respect to at least one dimension, preferably with respect to two dimensions.

Moreover, the method may further comprise the step of mechanically moving the device under test and/or the redundant array to create a synthetic two-dimensional redundant array over time. With respect to the device under test, it is noted that the device under test may especially comprise a radome, preferably an automotive radome. It is further noted that the redundant array may especially comprise at least one sparsity.

Figure 11:
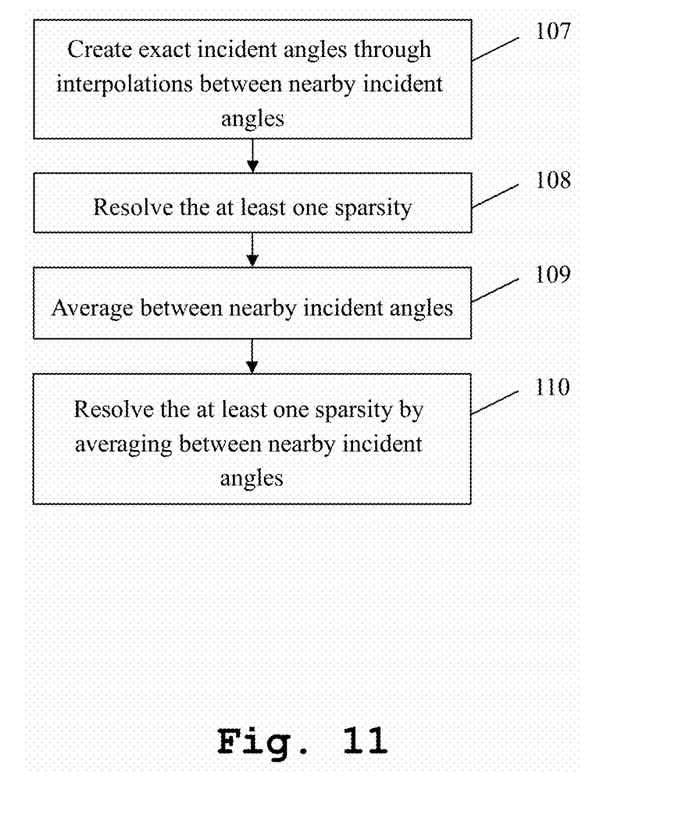
FIG. 11 shows a flow chart of a further exemplary embodiment of the second aspect of the invention.

In accordance with FIG. 11, it might be particularly advantageous if the method further comprises the step of creating exact incident angles through interpolations between nearby incident angles. In addition to this or as an alternative, the method may further comprise the step of resolving the at least one sparsity. Additionally or alternatively, the method may further comprise the step of averaging between nearby incident angles.

Further additionally or further alternatively, the method may comprise the step of resolving the at least one sparsity by averaging between nearby incident angles.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A multiple input multiple output millimeter wave imaging array for incident angle dependent millimeter wave images with respect to a device, the multiple input multiple output millimeter wave imaging array comprising:
   a redundant array of transmit and receive millimeter wave antennas, and
   a controller,
      wherein the controller is configured to implement a selection scheme, wherein the selection scheme selects respective transmit and receive millimeter wave antenna pairs for creating a corresponding millimeter wave image,
      wherein the redundant array is redundant with respect to one dimension, and wherein the device and/or the redundant array is mechanically moved to create a synthetic two-dimensional redundant array over time.

2. The multiple input multiple output millimeter wave imaging array according to claim 1, wherein the selection scheme is based on the desired incident angle which will be used to create the corresponding image.

3. The multiple input multiple output millimeter wave imaging array according to claim 1, wherein the transmit and receive millimeter wave antennas are disposed such that the transmit and receive millimeter wave antennas are approximately at the incident angle from one another from a respective specular point.

4. The multiple input multiple output millimeter wave imaging array according to claim 1, wherein a collection of the respective transmit and receive millimeter wave antenna pairs forms an array creating a distortion and/or alias minimized image.

5. The multiple input multiple output millimeter wave imaging array according to claim 1, wherein the controller is configured to reconstruct the corresponding image based on a densely sampled array.

6. The multiple input multiple output millimeter wave imaging array according to claim 1, wherein on the basis of a collection of the respective transmit and receive millimeter wave antenna pairs forming an array creating a distortion and/or alias minimized image, the controller is configured to reconstruct the corresponding image based on a corresponding sampled array.

7. The multiple input multiple output millimeter wave imaging array according to claim 1, wherein the redundant array is redundant with respect to at least one dimension.

8. The multiple input multiple output millimeter wave imaging array according to claim 1, wherein the device comprises a radome.

9. The multiple input multiple output millimeter wave imaging array according to claim 1, wherein the redundant array comprises at least one gap.

10. The multiple input multiple output millimeter wave imaging array according to claim 9, wherein the controller is configured to resolve the at least one gap.

11. The multiple input multiple output millimeter wave imaging array according to claim 9, wherein the controller is configured to resolve the at least one gap by averaging between nearby incident angles.

12. The multiple input multiple output millimeter wave imaging array according to claim 1, wherein the controller is configured to create exact incident angles through interpolations between nearby incident angles.

13. The multiple input multiple output millimeter wave imaging array according to claim 1, wherein the controller is configured to average between nearby incident angles.

14. A multiple input multiple output millimeter wave imaging method for incident angle dependent millimeter wave images with respect to a device, the multiple input multiple output millimeter wave imaging method comprising the steps of:
providing a redundant array of transmit and receive millimeter wave antennas, and
implementing a selection scheme,
wherein the selection scheme selects respective transmit and receive millimeter wave antenna pairs for creating a corresponding millimeter wave image, and
wherein the method further comprises the step of forming an array creating a distortion and/or alias minimized image with the aid of a collection of the respective transmit and receive millimeter wave antenna pairs.

15. The multiple input multiple output millimeter wave imaging method according to claim 14, wherein the selection scheme is based on the desired incident angle which will be used to create the corresponding image.

16. The multiple input multiple output millimeter wave imaging method according to claim 14, wherein the method further comprises the step of disposing the transmit and receive millimeter wave antennas such that the transmit and receive millimeter wave antennas are approximately at the incident angle from one another from a respective specular point.

17. The multiple input multiple output millimeter wave imaging method according to claim 14, wherein the method further comprises the step of reconstructing the corresponding image based on a sampled array.

18. A multiple input multiple output millimeter wave imaging array for incident angle dependent millimeter wave images with respect to a device, the multiple input multiple output millimeter wave imaging array comprising:
a redundant array of transmit and receive millimeter wave antennas, and
a controller,
wherein the controller is configured to implement a selection scheme,
wherein the selection scheme selects respective transmit and receive millimeter wave antenna pairs for creating a corresponding millimeter wave image, and
wherein the controller is configured to create exact incident angles through interpolations between nearby incident angles.

* * * * *